Jan. 24, 1933.  C. W. LIGHTHALL  1,895,167
BEARING
Filed March 5, 1932  2 Sheets-Sheet 1

INVENTOR.
Cone W. Lighthall
BY
Barnes, Kisselle & Laughlin
ATTORNEYS.

Jan. 24, 1933.  C. W. LIGHTHALL  1,895,167
BEARING
Filed March 5, 1932  2 Sheets-Sheet 2

INVENTOR
Cone W. Lighthall
BY Barnes, Kisselle & Laughlin
ATTORNEYS.

Patented Jan. 24, 1933

1,895,167

UNITED STATES PATENT OFFICE

CONE W. LIGHTHALL, OF ANN ARBOR, MICHIGAN, ASSIGNOR TO HOOVER STEEL BALL COMPANY, OF ANN ARBOR, MICHIGAN, A CORPORATION OF MICHIGAN

BEARING

Application filed March 5, 1932. Serial No. 596,994.

This invention relates to a bearing and it has to do particularly with the structure of an anti-friction bearing such as a ball bearing or roller bearing which includes a sealing arrangement for sealing against passage of a substance such as lubricant therethrough.

An object of the invention is to provide, in a bearing, a structure for effecting a seal which is particularly effective and efficient for providing a seal and which is capable of maintaining its effectiveness and efficiency over a long period of time; in other words, the structure is such that the seal is not reduced in efficiency due to wear.

One environment of the invention is in an anti-friction bearing having outer and inner race members, and the seal to the passage of lubricant, in such a case, may be located between the race members. In accordance with the invention the seal is provided in an arrangement where at least one of the sealing members is in the form of a sealing ring. These objects and other objects of the invention will become more apparent as the description of the invention progresses.

Figure 1:
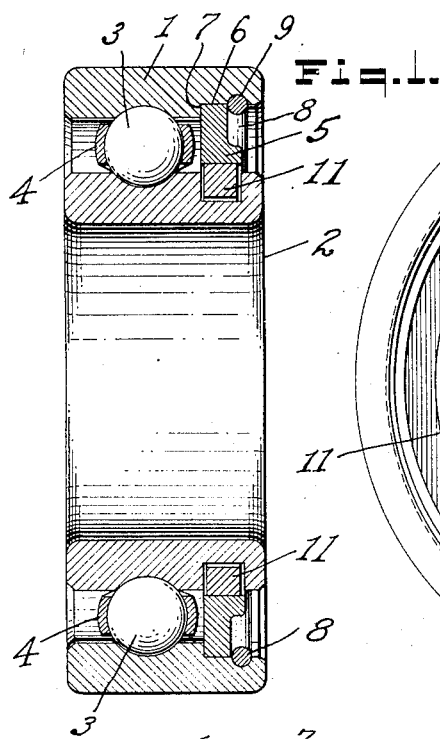
Fig. 1 is a sectional view taken through a single row ball bearing illustrating the invention.

An anti-friction bearing, as illustrated in Fig. 1, may have an outer race 1 and an inner race 2 for anti-friction balls 3. A series of balls may be held in a cage or retainer 4. There ordinarily is no particular means for preventing passage of lubricant between the inner and outer races. Bearings of this type are used in many places where escape of lubricant is undesirable, and accordingly as shown, a sealing arrangement is provided.

Figure 3:
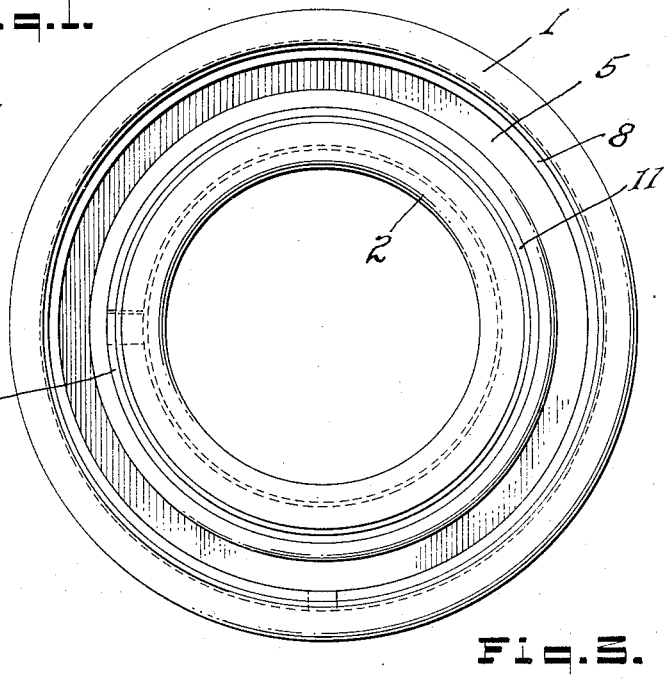
Fig. 3 is a side elevational view of Fig. 1 structure.

The parts constituting the seal may be incorporated directly with the inner and outer races. One race, as for example, the outer one, may be suitably shaped for the reception of a ring member 5 which may be disposed relatively tightly in position as regards the member 1. This member 5 may be a solid ring as illustrated in Fig. 3. Advantageously, the ring 5 may be made of metal relatively soft as compared to metals entering into the bearing structure, as for example, mild steel. This ring 5 may seat in position against the outer race 1 as at 6, and it may be located up against a shoulder 7. For retaining the ring 5 in place, a split spring ring 8 may be employed arranged to expand in a groove formation 9 in the outer race.

Figure 4:
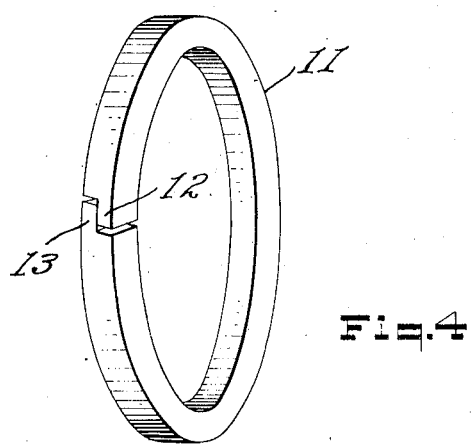
Fig. 4 is a plan view of a sealing ring.
Figure 5:
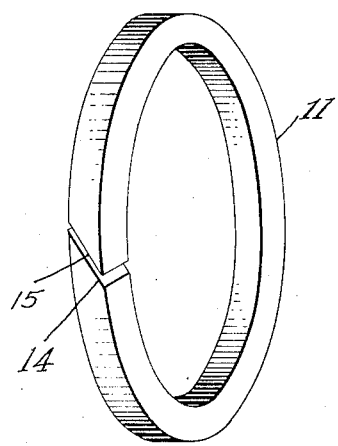
Fig. 5 is a plan view of another form of sealing ring.

One of the races, as for example, the inner race may be provided with a sealing ring groove 10 in which there may be disposed a sealing ring 11. This ring 11 may be similar in structure to split piston rings. For example, the ring may be of stepped formation, as illustrated in Fig. 4, wherein one end of the ring is reduced in thickness as at 12, and the other reduced as at 13, with these two parts overlapping and sealing against each other. The ring may be of other types as for example, the diagonally cut type as illustrated in Fig. 5 wherein the ends of the ring are diagonally cut, as at 14 and 15.

The ring 11 normally expands against the ring 5 so as to effect a sealing arrangement between the interengaging ring surfaces. These surfaces are preferably so formed as to maintain a good sealing contact with each other. Where the member 5 is of mild steel or the like, its inner surface may be merely broached out. Preferably, the arrangement is such that there is a relatively good fit of the ring 11 with the walls of the ring groove 10. The exact clearances need not be gone into, but it may be pointed out that working clearances may be sufficiently close to prevent lubricant from readily flowing therethrough.

Figure 2:
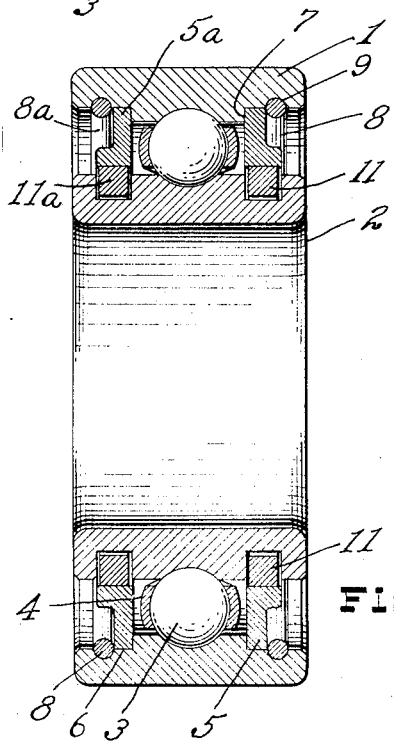
Fig. 2 is a sectional view showing a bearing similar to that in Fig. 1 provided with a double seal.

Quite probably, the action of capillarity aids in this respect. In Fig. 2, a single row ball bearing is shown, and this bearing is provided with a double seal, namely, one on each side of the ball bearings. As the parts are the same as those shown in Fig. 1, the same reference characters are applied and a separate description is unnecessary. However, the characters on the additional sealing structure are identified by the letter *a*.

Figure 6:
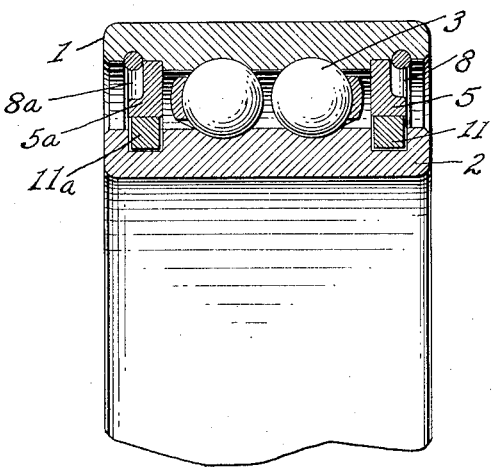
Fig. 6 is a sectional view through a portion of a different type of bearing.
Figure 7:
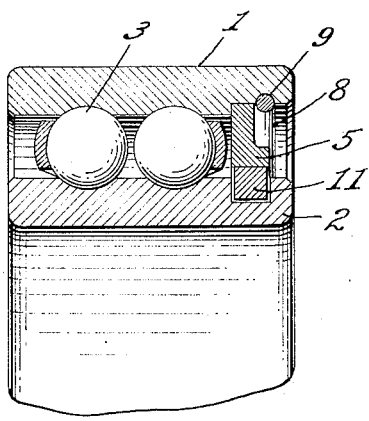
Figs. 7, 8 and 9 are sectional views illustrating the application of the invention to different types of bearings, and in different ways.

Modified forms of the bearings are illustrated in Figs. 6 and 7 where double rows of ball bearings are used. The form shown in Fig. 6 has the double seal on the double ball bearing, whereas the form shown in Fig. 7 has the single seal on the double row ball bearing. The same reference characters are employed in Figs. 6 and 7 as are employed in Figs. 1 and 2.

Figure 8:
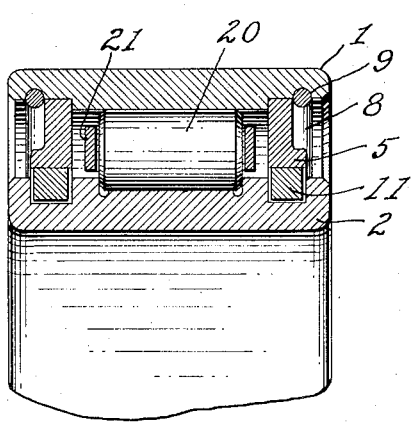
Figure 9:
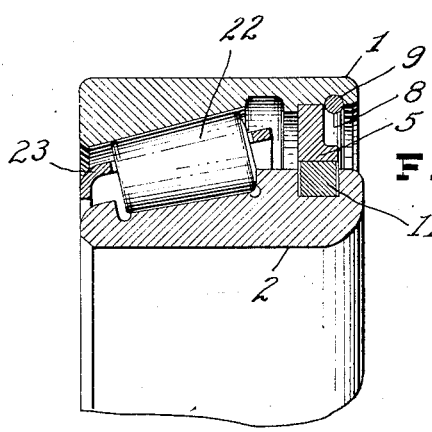

In Figs. 8 and 9 roller bearings are shown with the seal structure employed with the inner and outer races. In Fig. 6 the bearing is of a straight roller type, the roller being illustrated at 20 and a plurality of the same may be held in cage 21, while in Fig. 9 a taper type roller bearing is illustrated with one of the rollers at 22 and a plurality of which may be held by a cage 23. In the form shown in Fig. 8, a double seal is employed, while in Fig. 9 a single seal is employed.

Such a sealing structure may be employed for confining a lubricant in and around the vicinity of the anti-friction bearing elements. For example, in Fig. 2, and in those other formations having double sealing elements, the seal may well serve to confine a roller or ball lubricant. However, this bearing structure is useful in places where leakage of lubricant is undesirable. For instance, there are many places where a rotating shaft is journaled in the wall of a chamber or housing. The transmission housing in an automobile is a good example. The driving shaft entering the housing from the engine is usually journaled in the wall of the housing, and the housing is full of gear lubricant. The outer race may be seated against a portion of the housing, and the inner race on the shaft, so that lubricant passage may take place between the inner and outer races. However, the seal of this invention effectively prevents this. It may be pointed out that the present seal has been found satisfactory where used on a vertical motor shaft, where a relatively light oil was used in the bearing, and even with a light oil the seal prevented leakage and loss of the same.

While it has been mentioned that the solid ring may be of mild steel it is to be understood that such ring is not limited to this metal. Moreover, the sealing ring or split ring 11 may be of cast iron, brass, aluminum, or the same may be made of fiber or other composition. The stepped type of ring, as illustrated in Fig. 4, is thought to be preferred due to the fact that this type of ring affords a sealing contact between the reduced ends 12 and 13.

In use there may be relative rotational movement between the inner and outer races after the usual manner, and this relative rotation in the sealing structure takes place between the race with the ring groove and the split sealing ring, which in the present instance is between the inner race and the ring 11. Since the ring 11 expands into sealing engagement with the ring 5 there is little or no relative movement between these two rings. Accordingly, there is practically no wear on the sealing members so that the effectiveness and efficiency of the seal remains indefinitely.

The invention serves as well to keep dirt, dust or other extraneous matter from getting into the bearing elements. Ingress of such foreign substances may be detrimental to the bearing, as for example, such foreign substance may have an abrasive action; accordingly, long life and satisfactory bearing action is assured by the use of the seal of the present invention. Where the invention is employed for the purpose of retaining lubricant or the like, the structure, by the same token, prevents entrance into the working parts of foreign substance such as dirt, dust or the like. The manner in which the sealing ring 5 is retained in position is advantageous; that is to say, by means of the split ring, but it is within the invention to retain the ring 5 in its respective race in any desired manner.

I claim:

1. In an anti-friction bearing, an outer race member, an inner race member, anti-friction elements disposed between the races, said race members and elements being assembled into a self-contained unit, one of the race members having a circumferential groove formed directly in the metal thereof, a sealing ring located in the groove loosely whereby to permit relative rotation between the ring and grooved race member, the other race member having a circumferential shoulder in substantial alignment with the groove in the other race member, a solid ring associated with the shouldered race member and positioned up against said shoulder, said solid ring and sealing ring having engaging surfaces whereby to effect a seal, and means for retaining the said solid ring up against the shoulder of the race member.

2. In a self-contained anti-friction bearing, an outer race member, an inner race member, anti-friction elements disposed between the race members, the inner race member having a circumferential groove formed directly in the material of the race member, an expanding split sealing ring located in the groove, the outer race member having an internal diameter near one end greater than the internal diameter inwardly of said end and having a shoulder defining the portions of different diameters, a solid sealing ring substantially fitting within the portion of the outer ring having the said greater diameter and fitting up against said shoulder, the sealing ring and solid ring being in substantial alignment and having engaging sealing surfaces with the sealing ring expanding against the solid ring, and means for retaining the solid ring in the outer race member and up against the shoulder of the outer race member.

3. In a self-contained anti-friction bearing, an outer race member, an inner race member, anti-friction elements disposed between the race members, the inner race member having a circumferential groove formed directly in the material of the race member, an expanding split sealing ring located in the groove, the outer race member having an internal diameter near one end greater than the internal diameter inwardly of said end and having a shoulder defining the portions of different diameters, a solid sealing ring substantially fitting within the portion of the outer ring having the said greater diameter and fitting up against said shoulder, the sealing ring and solid ring being in substantial alignment and having engaging sealing surfaces with the sealing ring expanding against the solid ring, the outer race member having a circumferential groove in the portion having the greater diameter, and a split expanding ring positioned in said groove and abutting against one side of the said solid ring opposite the shoulder.

4. In an anti-friction bearing, inner and outer race members with anti-friction elements disposed between the race members, the inner race member having an annular groove formed directly in the material thereof, a split expanding sealing ring located in the groove, a solid sealing ring surrounding the said split ring and having an internal surface against which the split ring expands for sealing action, the outer race member having an inwardly extending shoulder disposed inwardly of one end, said solid ring being disposed within the outer race member and fitting with substantial tightness therein and disposed up against said shoulder, said outer race having a circumferential groove located between the shoulder and the adjacent end of the base member, and a split expanding ring disposed in said groove and substantially abutting against the side of the solid ring opposite the shoulder for holding the solid ring within the outer race member.

In testimony whereof I affix my signature.

CONE W. LIGHTHALL.